US008913462B2

(12) United States Patent
Tulett et al.

(10) Patent No.: US 8,913,462 B2
(45) Date of Patent: Dec. 16, 2014

(54) REAL-TIME REFLECTION POINT DENSITY MAPPING DURING THREE-DIMENSIONAL (3D) VERTICAL SEISMIC PROFILE (VSP) SURVEYS

(75) Inventors: John Richard Tulett, Yokohama (JP);
Philip Neville Armstrong, Yokohama (JP); Henry Menkiti, Twickenham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1309 days.

(21) Appl. No.: 12/418,164

(22) Filed: Apr. 3, 2009

(65) Prior Publication Data
US 2010/0254220 A1    Oct. 7, 2010

(51) Int. Cl.
G01V 1/00    (2006.01)
G01V 1/42    (2006.01)
G01V 1/30    (2006.01)

(52) U.S. Cl.
CPC  G01V 1/42 (2013.01); G01V 1/003 (2013.01); G01V 1/303 (2013.01); G01V 2210/161 (2013.01)
USPC .......................................................... 367/57

(58) Field of Classification Search
CPC .. G01V 1/003; G01V 1/303; G01V 2210/161
USPC .................................................. 367/38, 57
See application file for complete search history.

(56) References Cited

U.S. PATENT DOCUMENTS

| 4,894,809 A * | 1/1990 | Moeckel ........................ 367/57 |
| 4,953,142 A * | 8/1990 | Rimmer ......................... 367/73 |
| 5,999,487 A * | 12/1999 | Deplante et al. ................ 367/38 |
| 6,131,070 A * | 10/2000 | Ferber ............................ 702/14 |
| 7,535,800 B2 | 5/2009 | Sanders et al. |
| 2005/0060097 A1 | 3/2005 | Pramik et al. |

FOREIGN PATENT DOCUMENTS

WO    0159483    8/2001

OTHER PUBLICATIONS

G. Bear, et al."The construction of subsurface illumination and amplitude maps via ray tracing", The Leading Edge, Society of Exploration Geophysicists, US, Jul. 1, 2000, pp. 726-728, XP 002976126.
J. Hoffmann, et al., "The value of subsurface coverage modeling for seismic acquisition analysis", expanded abstracts with biographies, vol. 21, Jan. 1, 2002, pp. 37-40, XP 55004770.

(Continued)

Primary Examiner — Krystine Breier
(74) Attorney, Agent, or Firm — Daryl R. Wright; Jody DeStefanis

(57) ABSTRACT

Methods and apparatuses are disclosed for generating three dimensional (3D) vertical seismic profiles (VSPs) in a more time efficient manner. The methods and apparatuses enable faster and more efficient VSP surveys than previous techniques. Real-time updating of the velocity model and real-time reflection point density calculations are carried out, which are used to determine the location of the next seismic source firing. In the event the data of a particular bin has an insufficient fold, common image points (CIPs) or reflection point density, additional source firings may be carried out prior to moving the source. Further, in the event the data of a particular bin is excessive in terms of the fold, CIPs or reflection point density before the planned source firings for the bin are completed, remaining source firings for that bin may be skipped to save time and improve the efficiency of the data collection.

21 Claims, 15 Drawing Sheets

(56) References Cited

OTHER PUBLICATIONS

M. Brink, et al., "Infill decisions using simulated migration amplitutes", Expanded abstracts with biographies, vol. 23, Jan. 1, 2004, pp. 57-60, XP 55004769.

N. Moldoveanu, et al, "Onboard 3D & 4D subsurface target illumination: A tool to optimize streamer marine acquisition", Expanded abstracts with biographies, vol. 22, Jan. 1, 2003, pp. 4-7, XP 55004768.

Zhou H, "First-break vertical seismic profiling tomography for vinton salt dome," Geophysics, Society of Exploration Geophysicists, US, vol. 71, No. 3, May 1, 2006, pp. U29-U36, XP001243684.

* cited by examiner

REAL-TIME REFLECTION POINT DENSITY MAPPING DURING THREE-DIMENSIONAL (3D) VERTICAL SEISMIC PROFILE (VSP) SURVEYS

BACKGROUND

1. Technical Field

Methods and apparatuses are disclosed for generating borehole seismic surveys. More specifically, this disclosure relates to the generation of three-dimensional (3D) vertical seismic profiles (VSP) in a time-efficient and cost-efficient manner. More particularly, instead of firing the seismic source at regular and predetermined intervals and/or predetermined locations, this disclosure discloses methods and apparatuses for real-time reflection point density mapping of the seismic data after one or more seismic source firings for evaluating the sufficiency of the data in one area or bin before subsequent source firings are carried out in another area or bin. The actual coordinates or locations of the source firings are more accurately accounted for using a GPS system. The disclosed methods enable 3D VSPs to be produced faster, more efficiently and with enhanced data quality.

2. Description of the Related Art

Geophysical mapping techniques for determining subsurface formation structures include, for example, seismic surveying, magnetotelluric surveying and controlled source electromagnetic surveying, among others. Generally, a variety of different seismic surveying techniques may be used in performing seismic exploration on land and in marine environments.

Seismic energy travels downwardly from one or more seismic sources and is reflected from acoustic impedance boundaries below the surface of the earth. The seismic sources are typically disposed on land or suspended from a boat during firing. The reflected seismic energy is detected at the sensors or receivers disposed on land, the floor of an ocean or other body of water or, inside a borehole. Various techniques are known in the art for determining the structure of the subsurface formations below and/or adjacent to the receivers from recordings of the signals corresponding to the reflected seismic energy. Other techniques known in the art provide estimates of fluid content in porous subsurface formations from characteristics of the reflected seismic energy such as its phase and/or amplitude.

In recent years, offshore hydrocarbon exploration has been occurring at increasingly deeper depths of water. As the water depths increase and the wells that are drilled lengthen, recovery of hydrocarbons from subsurface formations becomes increasingly difficult and complex. To facilitate hydrocarbon recovery, sophisticated seismic surveys such as vertical seismic profiles (VSPs), are being used to provide detailed characterizations of subsurface formations.

VSPs are measurements made in a wellbore using acoustic receivers inside the borehole and seismic sources at the surface. VSPs can vary in the number and location of seismic sources and receivers, and how the receivers and sources are deployed. Conventional VSPs are generated from use of a surface seismic source, which is commonly a vibrator or dynamite shot-holes on land, or an air-gun in marine environments, and a receiver array disposed in the borehole. More recent techniques involve the use of a seismic source placed at the ocean floor or suspended from a boat and spaced away from the borehole.

VSPs are used for correlation between a surface seismic image and wireline logging data. VSPs can be used to tie surface seismic data to well data, providing a useful tie to measured depths. VSPs enable the conversion of seismic data to zero-phase data, and enable one to distinguish between primary reflections and multiple reflections. In addition, a VSP is often used for analysis of portions of a formation ahead of the drill bit.

Check-shot surveys are similar to VSPs in that acoustic receivers are placed in the borehole and a surface source is used to generate an acoustic signal. However, a VSP is more detailed than a check-shot survey as VSP receivers are typically more closely spaced than those in a check-shot survey. While check-shot surveys may include receiver intervals hundreds of meters apart, the Schlumberger Versatile Seismic Imager™ (VSI™) tool includes up to 40 receivers spaced from 5 to 30 meters apart for a tool length of up to 1200 meters. Further, a VSP uses the reflected energy contained in the recorded trace at each receiver position as well as the first direct path from source to receiver, while the check-shot survey uses only the direct path travel time.

Three dimensional (3D) VSPs are available through the use of offset operations. Offset operations usually include a seismic source having one to twelve or more air guns, a remote and movable installation, such as a boat or land vehicle, that moves to a fixed offset position from the wellbore, along a predetermined "walkaway line" or path away from the wellbore, or along a predetermined spiral path away from the wellbore. For 3D-VSP sources towed behind a boat, three to 12 air guns are typically used.

Although 3D VSPs are a valuable information tool for analyzing subsurface formations, acquisition of 3D VSP data by way of seismic waves that are generated by a surface source or seabed source is problematic. First, the time required to acquire an effective 3D VSP can range from a few to several days, resulting in large and costly seismic datasets and substantial costs in terms of rig time. Because of the time and expense involved in acquiring 3D VSPs, it is customary to acquire data outside of the important zones of interest as a safeguard against producing a 3D VSP with missing data, which results in additional costs and rig time. Further, because of the time involved in acquiring 3D VSPs, surveys can be cut short for weather reasons or equipment malfunction, which can result in incomplete data sets. Finally, data acquired from source firings at various locations in the survey may be poor, compromised and/or invalid due to various conditions beyond the control of the operator. Because data problems may not be discovered until after the survey is complete and during subsequent data processing, it is sometimes necessary to go back to the wellsite and perform additional source firings in order to satisfactorily complete a VSP.

A common data processing technique designed to avoid going back to the wellsite and performing additional source firings is the concept of "binning," which involves the duplicitous use of data from one area or "bin" of a target reflector in an area or bin of the target reflector where the data is insufficient. Currently available binning techniques will now be described in connection with FIGS. 7-12. At the outset, the concept of binning relates to the subdivision of a survey area of a target reflector 24 into a plurality of individual contiguous bins 40. Turning first to FIG. 7, a bin 40 is illustrated which includes six common image points (CIPs) 41 or a "fold" of six. The CIPs 41 of a bin 40 may be stacked together to provide a stacked trace at the center of the bin 40. In the example shown in FIG. 7, the six CIPs may each be from a different offset group. However, having a fold of six for each bin 40 of a survey may be unlikely and it is common for many bins 40 of a survey to have low folds or irregularities. Because of fold variations in the various bins 40 of a survey, the effectiveness of stacking is reduced. To provide a high degree of consistency in the folds of the various bins 40, binning is carried out.

For example, referring to FIG. 8, the survey was divided into twenty different bins 40. A closer inspection of the bins 40 of FIG. 8 reveals that the folds of the bins 40 varies from three (see the bin 40a disposed in the middle row, second column from the left) to seven (see, e.g., the bins disposed in all four corners). Without some sort of intervention, subsequent processes such as velocity analysis and stacking will be substantially less effective, with irregular offset distributions and cross-line scattering of image points within bins like the bin shown at 40a, 40b in FIG. 8.

FIG. 9 illustrates another binning technique wherein bins 40a, 40b, each with folds of three and four respectively, are expended by a fixed amount in opposite directions, in this example 25% in each direction, so as to encompass an additional three and two CIPs respectively. More specifically, the bin 40a is expanded by the fixed amount of 25% to encompass two CIPs from the bin 40c and by another fixed amount of 25% to encompass a single CIP from the bin 40d as shown in FIG. 9. Further, the bin 40b is expanded by fixed amount of 25% to encompass a single CIP from the bin 40c and by another fixed amount of 25% to encompass a single CIP from the bin 40f. After the fixed or overlap binning process is carried out as illustrated in FIG. 9, the bin 40a, originally with a fold of only three, now has a fold of six. Further, the bin 40b, originally with a fold of only four, now has a fold of six as well.

Turning to FIG. 10, instead of expanding the bins 40a, 40b by fixed amounts, the bins 40a, 40b are expanded by amounts sufficient to increase their respective folds to six. Thus, the bins 40a, 40b are expended by flexible or elastic amounts so as to increase their respective folds to a predetermined level of six. Turning to FIG. 11, three bins 40g, 40h, 40i of equal size are illustrated. The center bin 40g includes only eleven CIPs or fold of eleven while the outer bins 40h and 40i have folds of 42 and 46 respectively. To increase the fold of the center bin 40g, the bin 40g is expanded by 40% into the bin 40h and by 40% into the bin 40i to increase the fold of the bin 40g to 49 as shown in FIG. 11. Similarly, turning to FIG. 12, three bins 40j, 40k, 40l of equal size are illustrated. The center bin 40j includes only sixteen CIPs or fold of sixteen while the outer bins 40k and 40l have folds of 42 and 46 respectively. To increase the fold of the center bin 40j, the bin 40j is expanded by 20% into the bin 40k and by 20% into the bin 40l to increase the fold of the bin 40j to 36 as shown in FIG. 12. As shown above in FIGS. 9-12, with both overlap (fixed %) and elastic (variable) binning, the fold of a bin is artificially increased. Because a particular bin may contain more than one common image point (CIP) within a given offset group, redundancy editing may be required.

However, all of these binning techniques described in FIGS. 7-12 rely upon using data from adjacent bins to provide a sufficient number of CIPs in a bin where the fold is deficient. No new data is created and no attempt is made at obtaining additional data for the deficient bin. Further, each of the binning techniques illustrated in FIGS. 7-12 are post acquisition, and cannot readily be performed in real time. Further, the binning techniques of FIGS. 7-12 assume that reflection point data is available from the adjacent bins. However, this assumption is not always true and cannot be guaranteed during the survey. If data from an adjacent bin is not available, the operator will not find out until after the survey is complete and the equipment has been withdrawn. With marine 3D-VSP surveys acquired during rough sea conditions, control of the source location may be compromised, leading to uneven reflection point density coverage in the subsurface. When using the binning techniques of FIGS. 7-12, this type of problem may result in oversized bins that seek to combine reflection points that are widely separated, thereby causing undesirable smearing of the data. If the impact of such acquisition problems on the true reflection point density at the target could be estimated in real-time, then it would be possible to adjust the acquisition effort to avoid such problems occurring.

Thus, more cost efficient and time efficient methods for acquiring VSPs are needed that provide real time assurances that the seismic data is of a high quality and that provides the operator with an indication as to when a survey may be stopped.

SUMMARY OF THE DISCLOSURE

Method of generating three dimensional (3D) vertical seismic profiles (VSPs) are disclosed which, in real time, use one-way transit times to produce reflection point density maps for bins of the target reflector and adjust surface source points and firings accordingly to increase or decrease the reflection point density of a bin in real time during the survey.

One disclosed method comprises planning a 3D-VSP survey including planning a plurality of surface source points and at least one subsurface target reflector. The method further comprises dividing the subsurface target reflector into a plurality of bins, and for each bin, carrying out the following steps: 1) firing at least one source at a surface source point at a source firing time, 2) acquiring subsurface data as a result of the source firing, 3) updating a velocity model in real-time based on the acquired subsurface data, 4) generating a reflection point density map for the bin based on the updated velocity model, and 5) comparing the generated reflection point density against a desired reflection point density for the bin. Then, if the generated reflection point density is less than the desired reflection point density for the bin, parts (1) through (5) are repeated until the generated reflection point density is equal to or greater than the desired reflection point density for the bin. In contrast, if the generated reflection point density is equal to or greater than the desired reflection point density for the bin, the at least one source is moved to a subsequent source point and parts (1) through (5) are repeated for a subsequent bin until the generated reflection point density is equal to or greater than the desired reflection point density for all bins of the target of reflector.

In a refinement, the planning of the 3D-VSP survey includes integrating surface data selected from the group consisting of graphical information system (GIS) data, maps, restriction zones and combinations thereof, with subsurface data selected from the group consisting of wellbore geometry, velocity models, known target reflectors and combinations thereof.

In another refinement, the planning of the 3D-VSP survey further comprises tolerances for the plurality of surface source points.

In another refinement, the planning of the 3D-VSP survey further comprises planning a number of subsurface receivers, subsurface receiver depths, subsurface receiver orientations and combinations thereof.

In another refinement, the part (2) further comprises acquiring surface data as well as subsurface data.

In another refinement, the subsurface data is selected from the group consisting of subsurface receiver depths, subsurface receiver orientations, one-way transit times at the subsurface receivers, and combinations thereof.

In another refinement, the surface data is selected from the group consisting of source point location, source firing time and combinations thereof.

In another refinement, part (3) further comprises updating the velocity model based on one-way transit times at the subsurface receivers, orientation of the subsurface receivers and source point location.

In another refinement, part (3) further comprises generating a ray-trace model from the updated velocity model and wherein part (4) further comprises using the ray-trace model to generate the reflection point density map.

In another refinement, a plurality of surface source points and the plurality of source firings are planned for each bin, and in part (5)(b), if the generated reflection point density is greater than the desired reflection point density, the plurality of surface source points and surface source firings planned for the bin is reduced.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are illustrated graphically, diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1A:
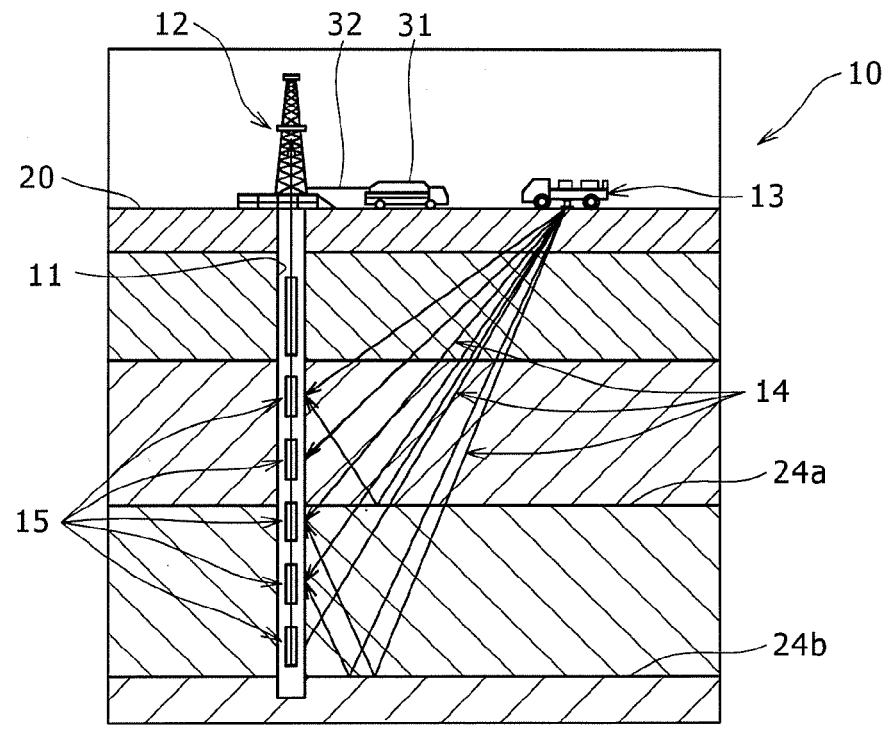
FIG. 1A is a general illustration of a seismic receiver array deployed in a vertical borehole and a movable seismic land-based source vehicle.
Figure 1B:
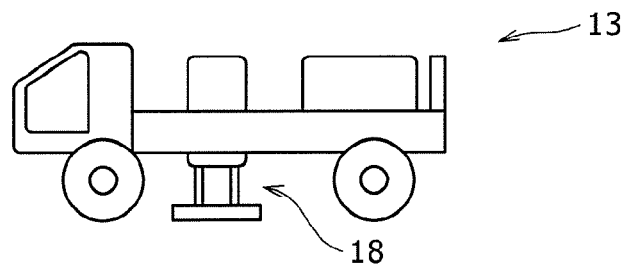
FIG. 1B is a side plan view of a land-based source vehicle.
Figure 1C:
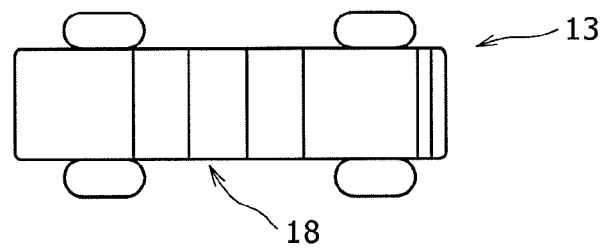
FIG. 1C is a top plan view of the source vehicle shown in FIG. 1B.

Referring to FIG. 1A, a general illustration is shown of a VSP survey 10 being conducted on a vertical well or borehole 11 that has been drilled using a land-based drill rig 12. A land-based movable seismic source vehicle 13 is also shown on the surface for generating seismic signals or source propagation paths shown generally at 14 at the surface 20 that are reflected off of one or more target reflectors 24a, 24b to be detected by an array of spaced-apart downhole directional receivers 15. The receivers 15 are in communication with a logging truck 31 via a wireline 32. The source vehicle 13 shown is intended to be illustrative of one or more seismic source vehicles that can be simultaneously placed at various azimuths around the borehole 11 and move from one location to another during the survey. FIGS. 1B and 1C illustrate a land-based source vehicle 13 with a vibrator or source element 18 while FIGS. 2, 3C, 6 and 14-16 illustrate a marine-based source vessel 13' equipped with sources 18' in the form of air guns 18'. The boat 13' (FIGS. 2, 3C, 6 and 14-16) may be a typical oilfield supply vessel or a dedicated marine seismic vessel.

Figure 2:
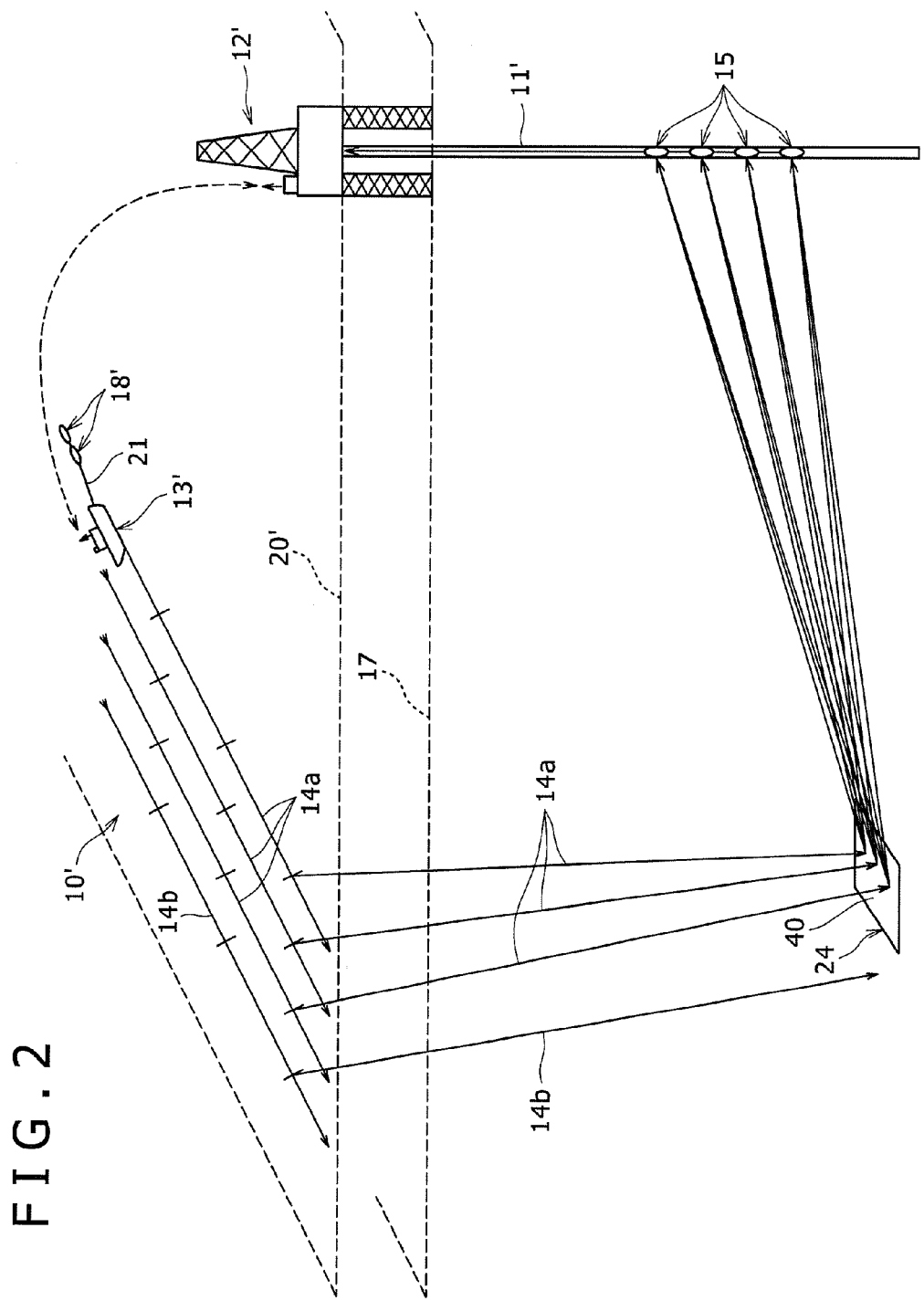
FIG. 2 is a schematic illustration of a seismic receiver array deployed in a borehole and a movable marine seismic source.

For marine applications, as shown in FIG. 2, seismic sources 18' are preferably towed behind a boat 13' at or near the surface 20' of the water, or in some cases, near the ocean floor or lake bottom 17 as described in commonly assigned U.S. Patent Application Publication No. 2006/0256651. Such seismic sources 18', when fired under precisely controlled conditions of location and time, provide seismic data that are suitable for purposes of marine seismic surveys. Therefore, seismic waves from the seismic events occurring at the floor 17 or surface 20' will travel through the earth and reflect off of one or more target reflectors 24 to the directional receivers 15.

In FIG. 2, a VSP survey 10' is illustrated for a marine or offshore rig 12' and borehole 11', which may be vertical as shown or deviated. The directional receiver array 15 is shown deployed in the borehole 11'. The movable source vehicle 13' is in the form of a boat 13' equipped with its one or more air guns or seismic sources 18', a hydrophone or other sensor (not shown), and an umbilical or cable 21. As illustrated in FIG. 2, a bin 40 of a limited area has been defined on the target reflector 24 and some of the source propagation paths 14a reflect off of the bin 40 to the receivers 15 and at least one of the source propagation paths 14b engages the target reflector 24 outside of the bin 40, leaving the bin 40 with an inadequate reflection point density. As illustrated below in connection with FIGS. 7-12, no current techniques exist for recognizing inadequate reflection point densities in defined bins 40 during the generation of a survey and the only known techniques for remedying inadequate reflection point densities involves the use of duplicative use reflection points from adjoining bins which compromises the accuracy of the survey, at least for the bins 40 with insufficient reflection point densities.

Figure 3A:
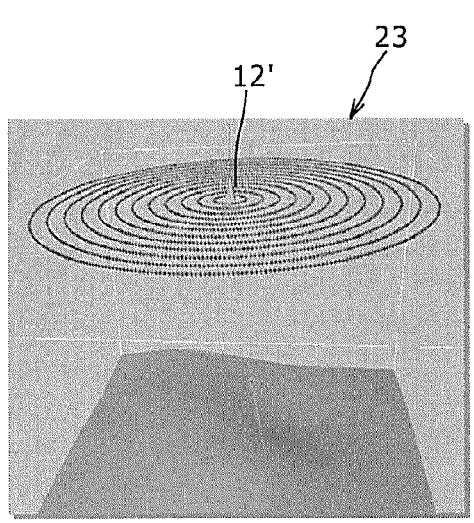
FIGS. 3A and 3B graphically illustrate an exemplary seismic survey conducted over a spiral pattern extending outward from a wellhead, wherein the proposed spiral pattern is shown in FIG. 3A and the actual spiral pattern is shown in FIG. 3B.
Figure 3B:
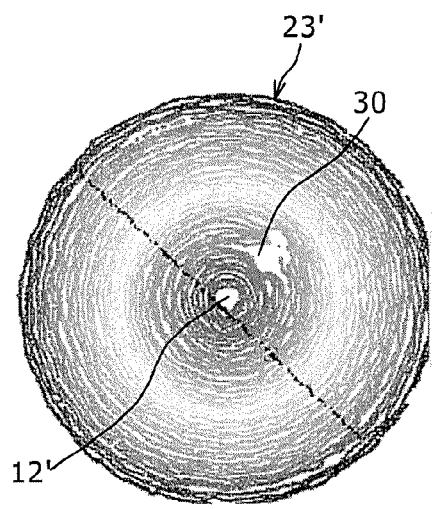
Figure 3C:
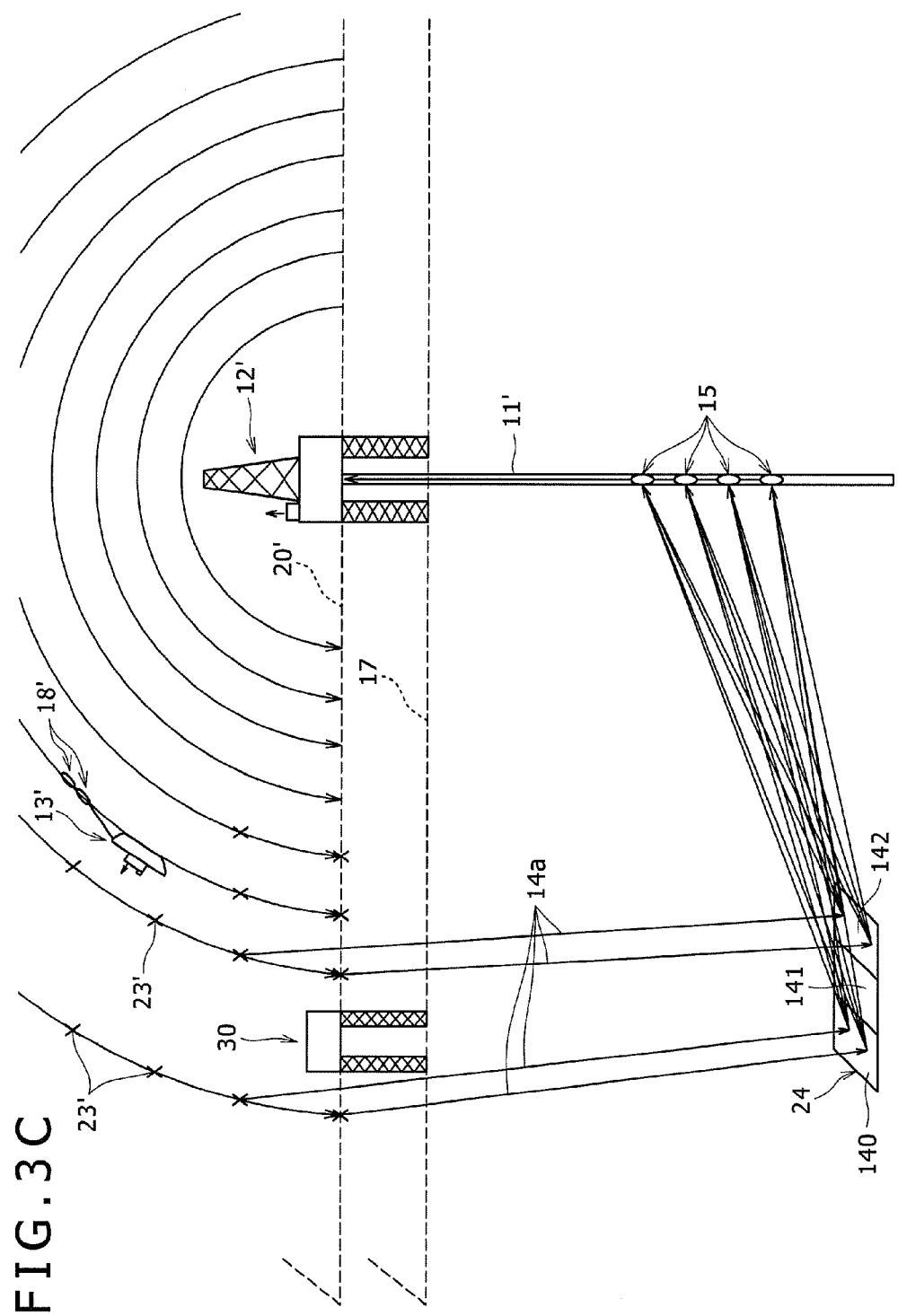
FIG. 3C is a schematic illustration of a seismic receiver array deployed in a borehole, a movable marine seismic source, and an obstruction in the proposed source pattern.

Turning to FIGS. 3A and 3B, a proposed spiral shot or survey pattern 23 and an actual shot pattern 23' are illustrated. In the example shown in FIG. 3B, the actual survey was conducted along a large spiral pattern with an obstacle shown at 30 that could be a drill platform or ship or other unmovable obstacle causing a blank area in the pattern 23'. As illustrated below in connection with FIGS. 3C, 13 and 17, the presence of the obstacle 30 can be compensated for by executing additional source firings 23a (FIG. 17) in the vicinity of the obstacle 30 in order to increase the fold or reflection point density for a bin 141 that would otherwise have an insufficient fold or reflection point density due to the presence of the obstacle 30. The disclosed method generates real data for the bin 141 without "borrowing" data from adjacent bins 140, 142 as explained above in connection with FIGS. 7-12.

Figure 4:
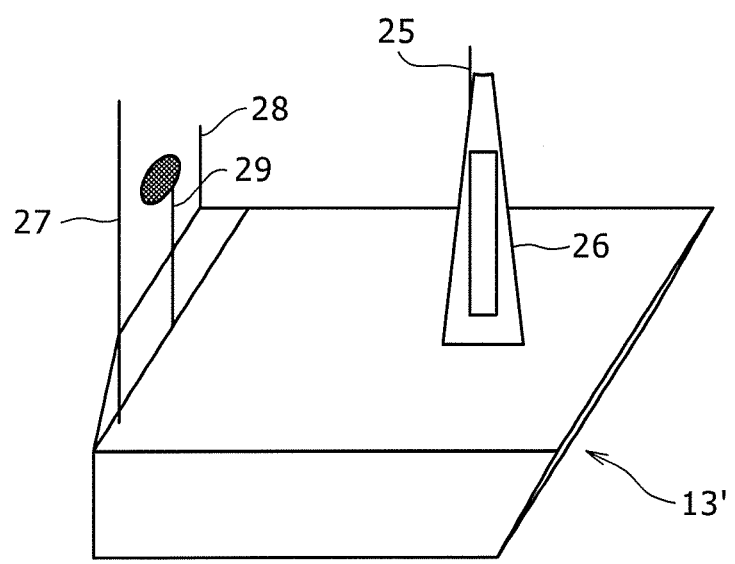
FIG. 4 illustrates, diagrammatically, an antennae installation on a movable seismic source vehicle, such as a boat, particularly illustrating the placement of a GPS antenna, a 450 MHz source antenna, a 900 MHz source antenna, and a 450 MHz navigation antenna, with vertical spacings between the antennae.
Figure 5:
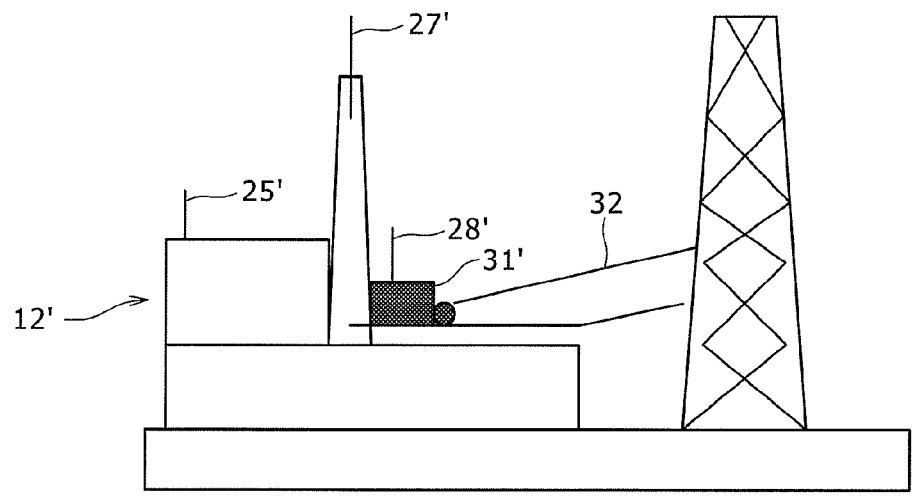
FIG. 5 illustrates, diagrammatically, an antennae installation at a wellsite, particularly illustrating the placement of a 450 MHz source antenna, a 900 MHz source antenna, and a 450 MHz navigation antenna, with vertical spacings between the antennae.
Figure 6:
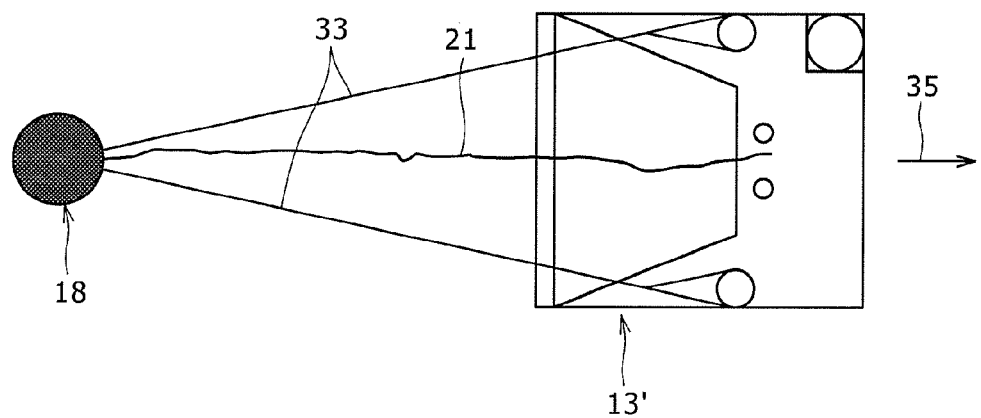
FIG. 6 illustrates, diagrammatically, a tow cable arrangement for use on a boat used to tow a group of seismic sources.
Figure 7:
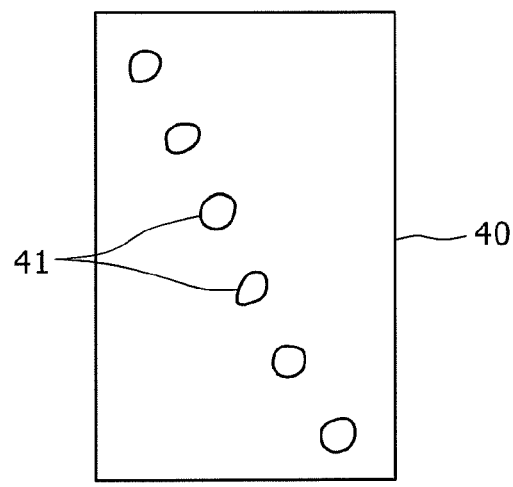
FIG. 7 illustrates one bin of a survey area with six common image points (CIPs) or a "fold" of six.
Figure 8:
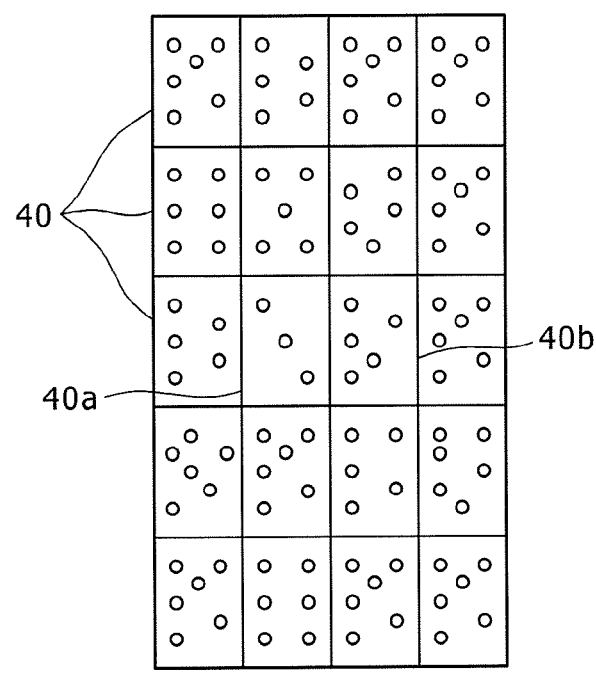
FIG. 8 illustrates a conventional binning technique where the survey area is divided into a plurality of bins of uniform size, but differing folds.
Figure 9:
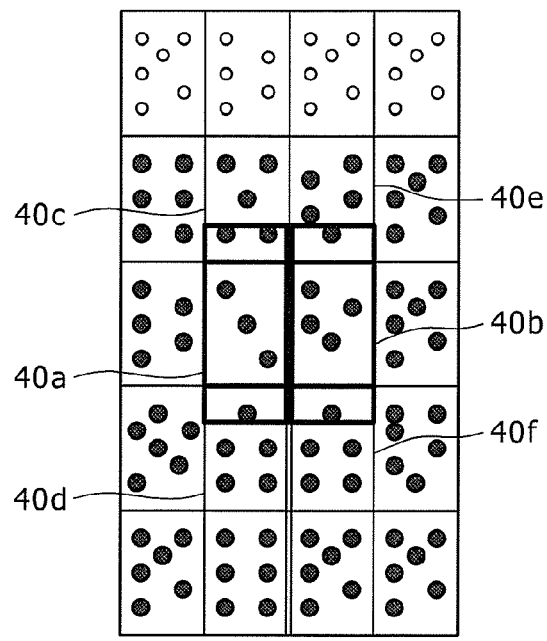
FIG. 9 illustrates another conventional binning technique where two bins are expanded by a fixed amount of 25% in this example, to increase the folds of the expanded bins from three to six and from four to six.
Figure 10:
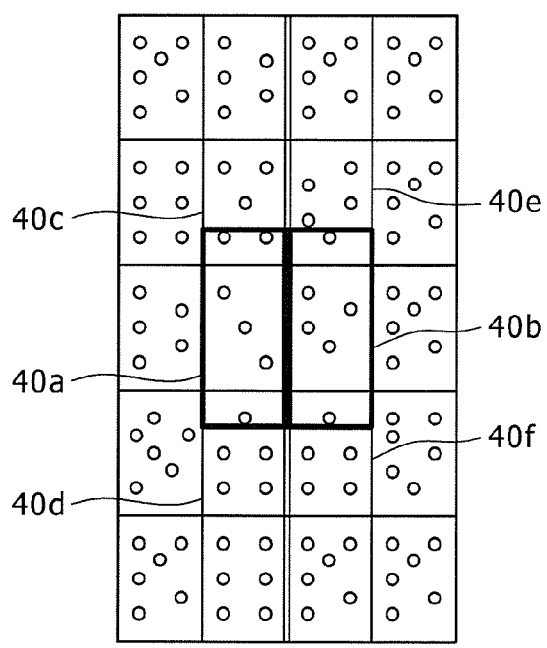
FIG. 10 illustrates another conventional binning technique where two bins are expanded by a flexible amount intended to increase the fold of the expanded bins to six, in this example, with one bin being expanded to include three additional CIPs and the other bin expanded to include two additional CIPs.
Figure 11:
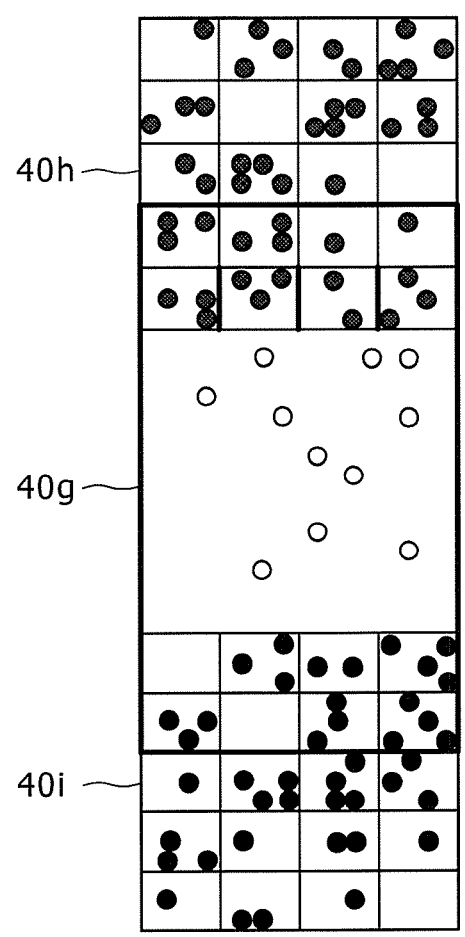
FIG. 11 illustrates another example of the binning technique illustrated in FIG. 9 where one bin is expanded by a fixed amount of 40%, in this example, to increase the fold of the expanded bin from 11 to 49.
Figure 12:
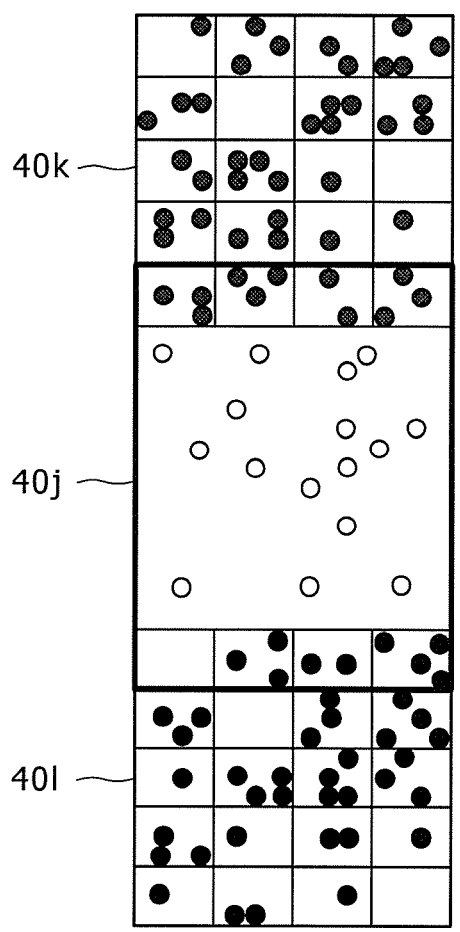
FIG. 12 illustrates another example of the binning technique illustrated in FIG. 9 where one bin is expanded by a fixed amount of 20%, in this example, to increase the fold of the expanded bin from 16 to 36.

In FIG. 4, a plurality of antennas 25, 27, 28, 29 are utilized such as a 450 MHz serial communications radio modem antenna 25 mounted on the mast 26 as a backup or, where the penetration/range of a 450 MHz radio modem performs better in marginal conditions, a 900 MHz Ethernet radio modem antenna 27 for sending data at high speeds, a 450 MHz navigation antenna 28 and a GPS antenna 29. The number, frequency, lateral spacing, vertical spacing and end use of the antennas 25, 27, 28, 29 can vary greatly as will be apparent to those skilled in the art. One suitable navigation system is Schlumberger's SWINGS™ navigational system. Turning to FIG. 5, a similar setup is employed at a land-based wellsite 12' with antennas 25', 27', and 28'. A logging unit or processing station is shown at 31' is equipped with a wireline 32 (see also FIG. 1). The directional receivers 15 (FIGS. 1, 2, 3C, 14-17) may also form part of a MWD or LWD drill string. A partial top view of the source boat 13' is illustrated in FIG. 6. Dual tow cables 33 are utilized for purposes of stabilizing the seismic sources 18' (see FIG. 2). The direction of travel of the boat 13' of FIG. 6 is indicated by the arrow 35.

Figure 13:
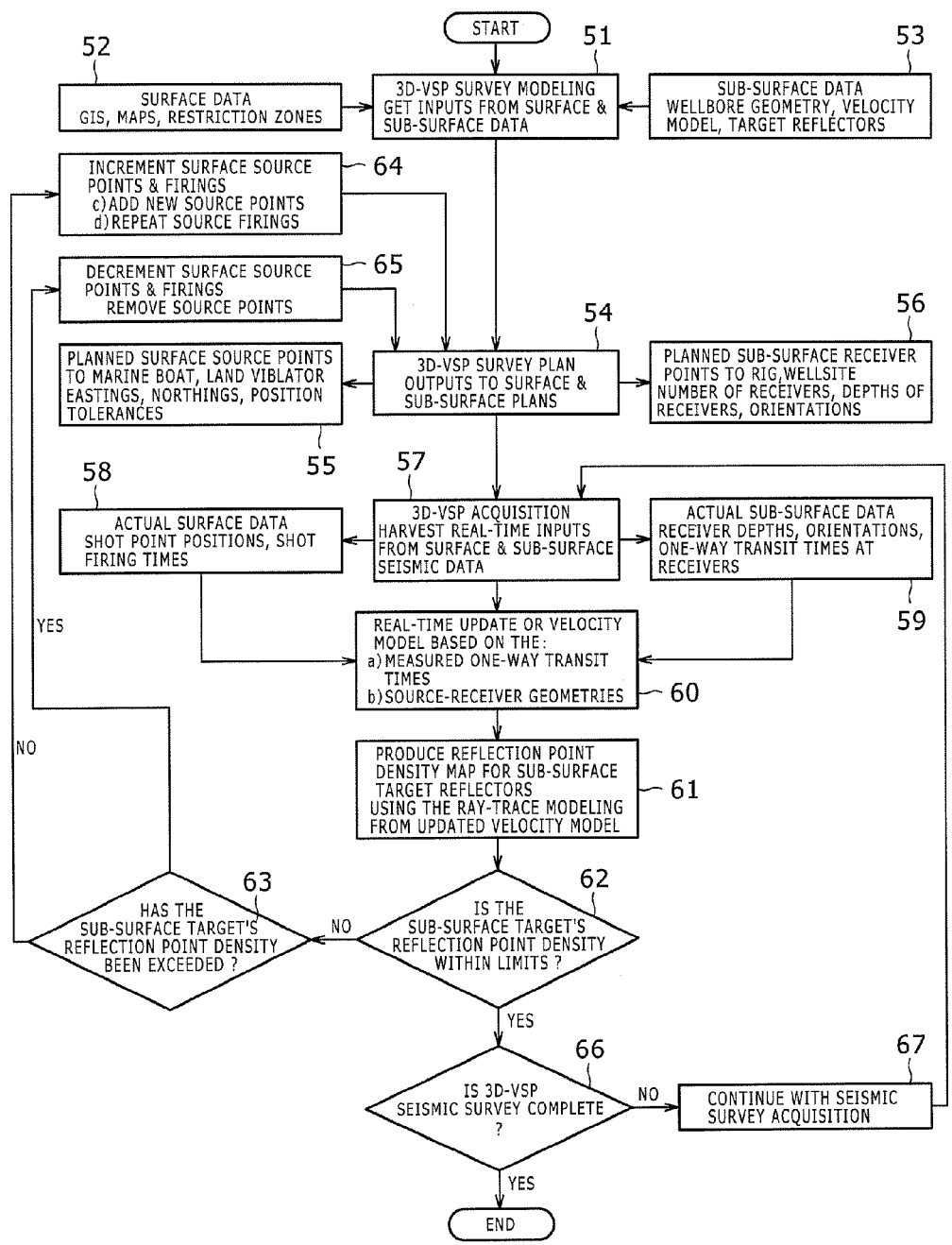
FIG. 13 is a flow chart of a disclosed real-time binning technique.

FIG. 13 illustrates a process for increasing the fold of a bin or the reflection point density of the bin to a sufficient level by generating additional data, and avoiding the "borrowing" of data utilized by past post-survey binning techniques illustrated in FIGS. 7-12 above. Specifically, a decision to carry out a 3D-VSP modeling is made at 51 based on surface data 52 in the form of one or more of graphical information system (GIS) data, surface maps, knowledge of restricted zones, etc. and subsurface data 53 including one or more of wellbore geometry, velocity models, target reflectors, etc. A survey pattern 23 (FIG. 3A) or planned source point locations are generated at 54 and sent to the source vehicle 13, 13' at 55, and the number of receivers, the depths of the various receivers 15 (FIGS. 1-2), the receiver 15 spacings and the receiver 15 orientations are generated at 54 and sent to the rig or wellsite at 56.

After the 3D-VSP plan is created at 54, the receivers 15 are lowered into the borehole 11, 11' to the desired positions and the source vehicle 13, 13' is moved to its starting location. Data acquisition begins at 57 with one or more source 18' firings. Actual surface data is collected 58 in the form of source point locations, or the points where sources are fired, and source firing times. Optionally, but not necessarily, all surface data can be tied into a global positioning system (GPS) as well as a coordinated universal time standard (UTC). The actual surface data 58 is combined with the actual subsurface data 59 which may consist of receiver 15 depths, receiver 15 orientations, one-way transit times at the receivers 15, etc. The real-time inputs from the surface data 58 and subsurface data 59 are combined at 60 to generate a real-time updated velocity model.

The real-time updated velocity model is based upon a pre-existing model in combination with the measured one-way transit times at the receivers 15, and the source 18'/receiver 15 geometries or orientations. Previously, the measurement of one-way travel times and the use of the one-way travel times in real-time to update the velocity model and to adjust the ongoing acquisition effort could not be accomplished. The measurement of one-way travel times necessitates the deployment of receivers 15 in the borehole 11'.

Figure 14:
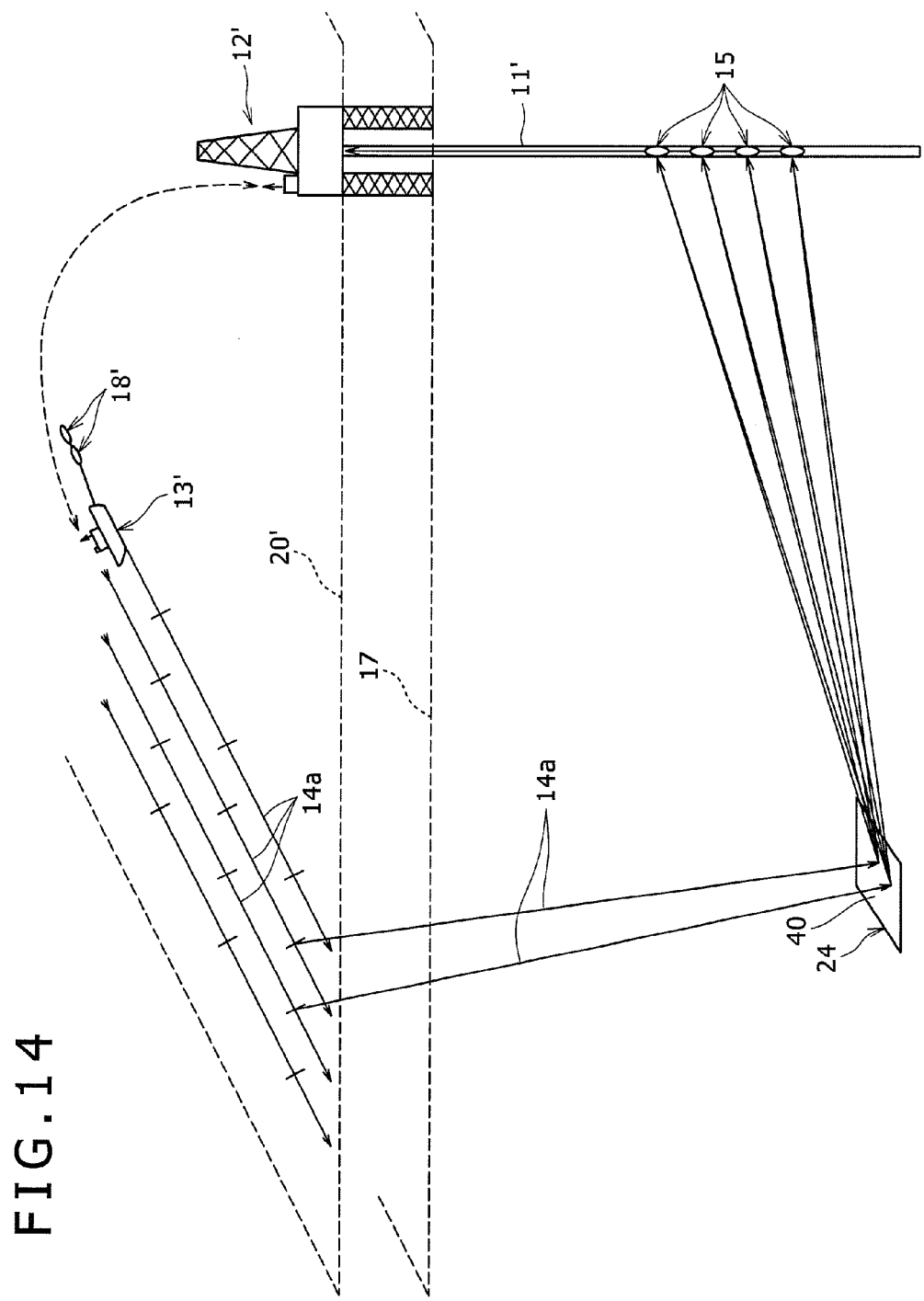
FIG. 14 illustrates subsurface data of a bin with inadequate reflection point density or fold, which could have been continued and/or rectified if the real-time binning/reflection point density mapping disclosed herein were available to the operator.
Figure 15:
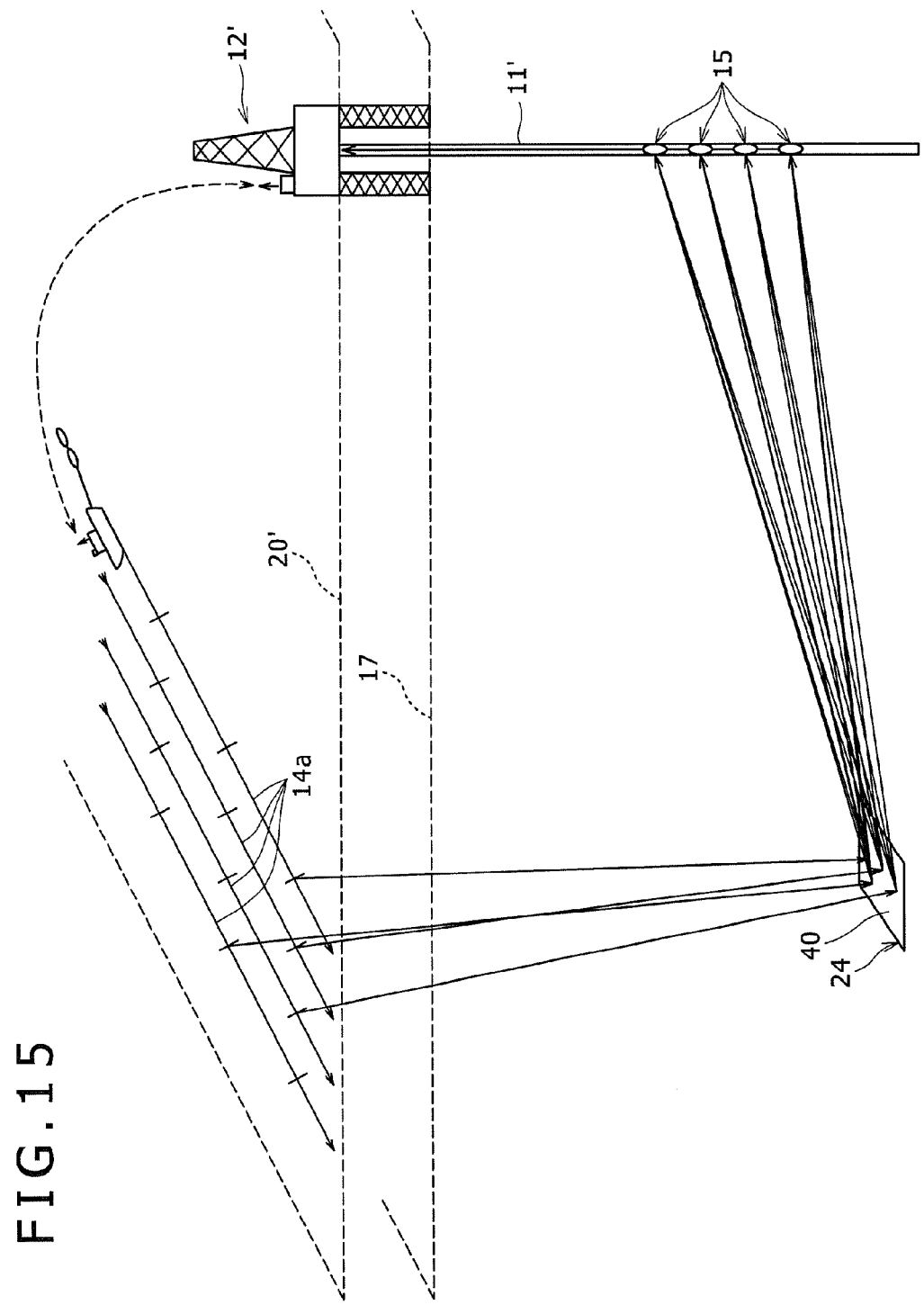
FIG. 15 illustrates subsurface data of a bin with adequate reflection point density or fold.
Figure 16:
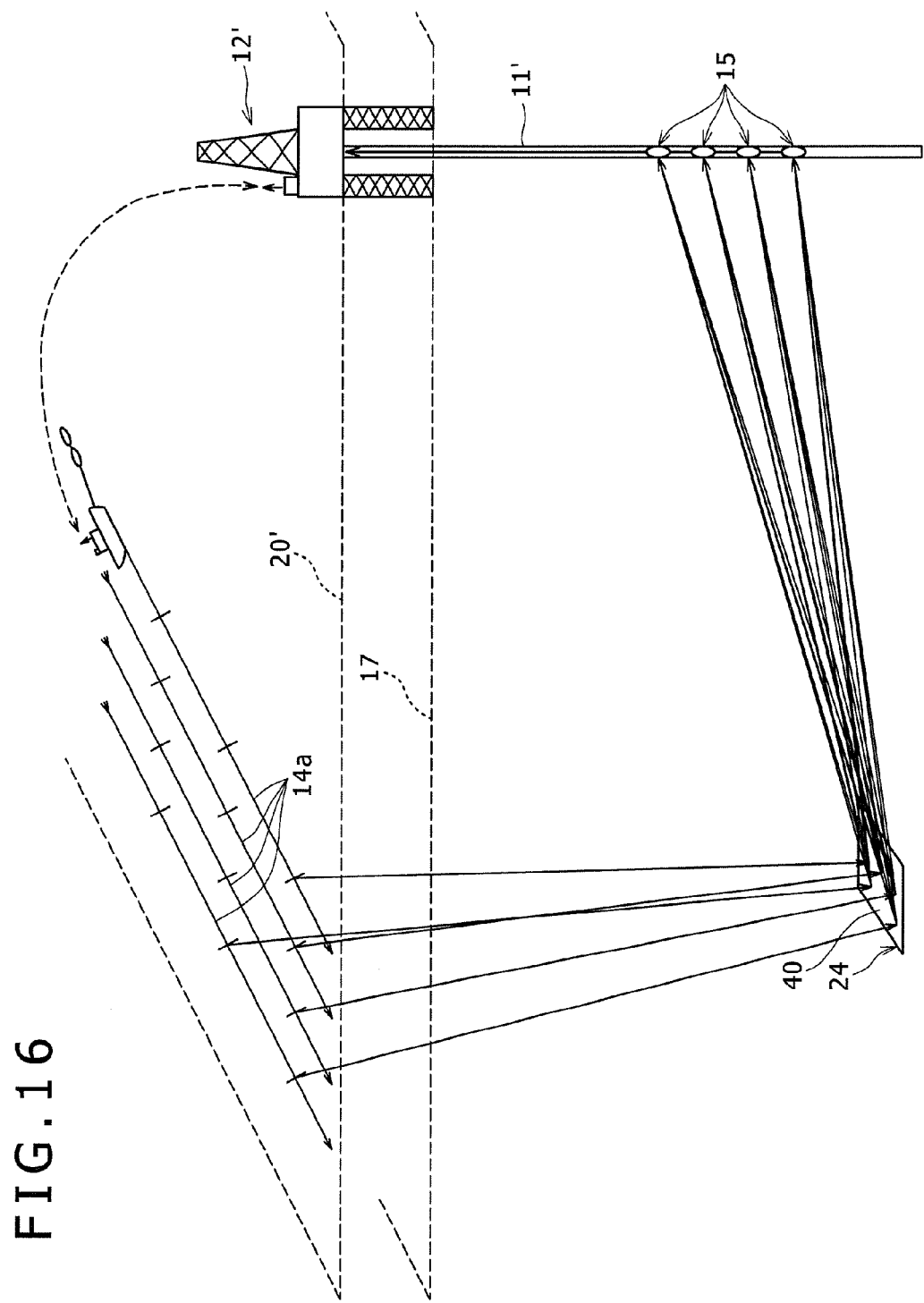
FIG. 16 illustrates subsurface data of a bin showing excess reflection point density or fold, wherein the survey could have been stopped earlier, if the real-time binning/reflection point density mapping disclosed herein were available to the operator.

A reflection point density map is created at 61 from the updated velocity model 60 or a ray-tracing based on the updated velocity model 60. The reflection point density map 61 may cover a single bin 40 as shown in FIGS. 14-16 or the target reflector 24 of interest may have been previously divided into a plurality of bins 40. Further, during the planning 54 of the 3D-VSP survey, the target reflector 24 may be divided into a plurality of bins 40 and one or more source points may have been assigned to each bin 40, based upon the number of receivers 15, depths of the receivers 15 and the source 18'/receiver 15 orientations. Also, during the planning 54 of the 3D-VSP survey, a reflection point density value or a reflection point density range (also commonly referred to as a fold or number of CIPs) may be assigned. The reflection point density value or range may be constant for each bin 40 or may vary.

After the reflection point density map is created at 61 for a particular bin 40, a determination is made at 62 as to whether the fold of the bin 40 is within the limits of the reflection point density range. If the reflection point density is not within the prescribed or desired reflection point density range, a determination is made at 63 as to whether the actual reflection point density exceeds or falls below the desired reflection point density range. If the number of reflection points is deficient, additional source firings and/or additional source points are added at 64 to the 3D-VSP survey plan 54 and the acquisition 57, updating of the velocity model 60 and reflection point density map creation 61 steps are repeated.

If it is determined at 63 that the actual number of reflection points exceeds the desired reflection point density range, the number of source points for the particular bin 40 is reduced at 65 and the steps 54, 57 and 60-62 are repeated. Finally, if the actual number of reflection points falls within the desired reflection point density range at 62, a determination is made at 66 as whether the 3D-VSP survey is complete, and if additional source firings at new source points or subsequent bins 40 needs to be carried out, the survey is continued at 67 and the steps 57, 60-62 are repeated.

In the examples illustrated in FIGS. 14-16, a target reflection point density is four (4). As shown in FIG. 14, only two (2) source propagation paths 14a hit the bin 40 before being reflected to the receivers 15 thereby providing an insufficient reflection point density of two (2) for the bin 40. In this scenario, the process steps 63, 64, 54, 57, 60, 61 and 62 are repeated until the reflection point density reaches the target level of four. Additional surface source points and firings are created at 64 to provide the desired reflection point density for the bin 40 without using data from adjacent bins. In contrast, FIG. 15 illustrates a scenario where the reflection point density is at a target level of four (4) and FIG. 16 illustrates a reflection point density of five (5), in excess of the target reflection point density of four (4). In the case of FIG. 16, if the target reflection point density of five is outside the desired range or limit, the steps 63, 65, 54, 57, 60, 61 and 62 are repeated to bring the target reflection point density down to the desired level. Further, the process steps 63, 65, 54, 55 may be carried out to adjust the surface points and firings for subsequent bins thereby possibly speeding up the VSP survey process and reducing the use of rig time.

Figure 17:
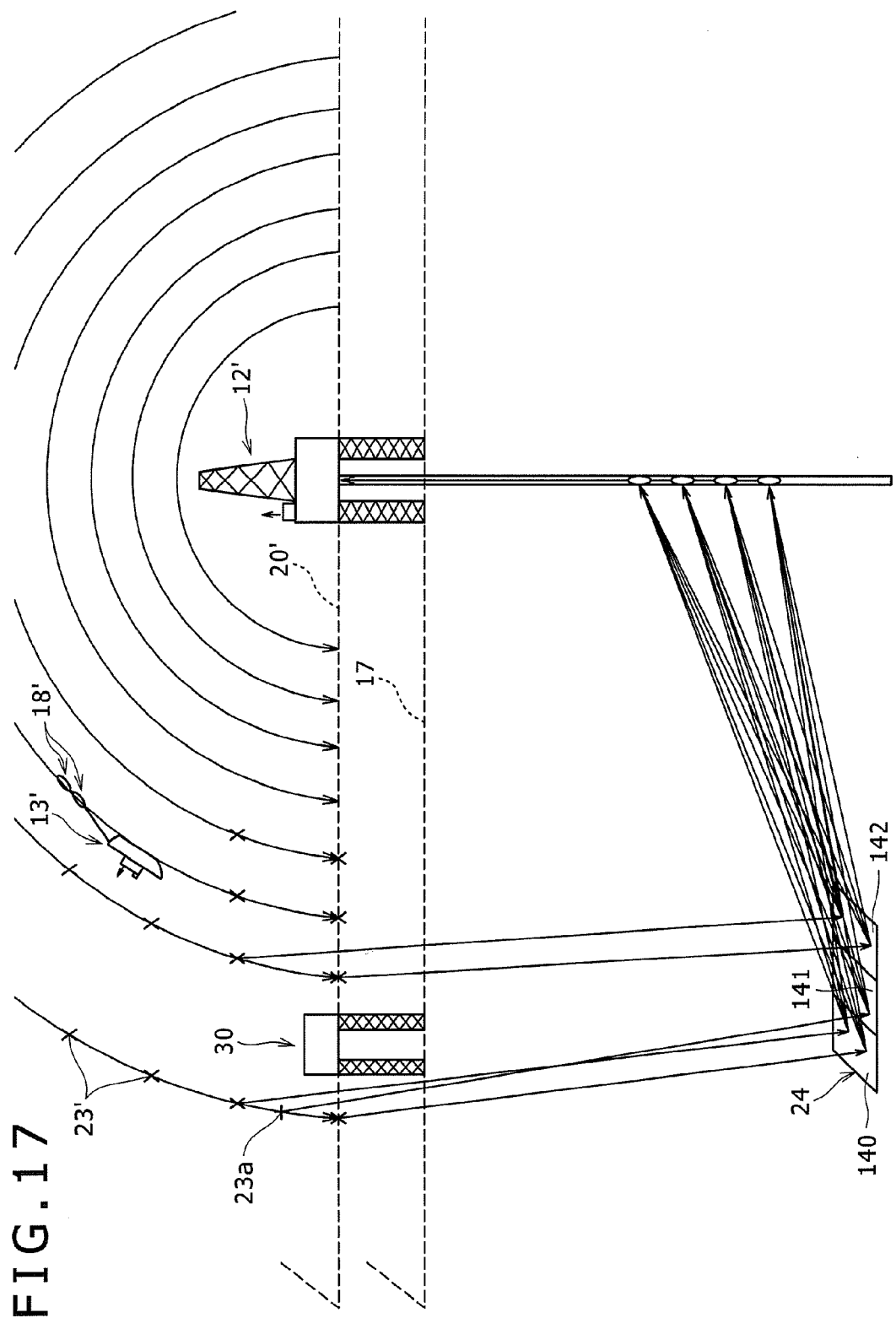
FIG. 17 is a schematic illustration of a seismic receiver array deployed in a borehole, a movable marine seismic source, an obstruction in the proposed source pattern and the addition of incremental source positions for covering a target bin that is otherwise blocked by the obstruction if the proposed source pattern is strictly followed.

As illustrated in FIG. 17, the presence of the obstacle 30 is compensated for at steps 63-64 by executing additional source firings 23a in the vicinity of the obstacle 30 in order to increase the fold or reflection point density for a bin 141 that would otherwise have an insufficient fold or reflection point density due to the presence of the obstacle 30. The disclosed method generates real data for the bin 141 without "borrowing" data from adjacent bins 140, 142. According, the method illustrated in FIGS. 13-17 provides improved reflection point densities for obstructed bins 141 during the initial survey thereby avoiding a situation where the seismic personnel must return to the wellsite in an attempt to fill in or populate gaps or voids in the 3D-VSP survey.

Although the above described embodiments are in the context of seismic surveys, the techniques described herein are also applicable to electromagnetic measurements and logging-while-drilling (LWD) survey systems, where the source is located, for example, at the surface and horizontally offset from the downhole recording system in the borehole. In this, electromagnetic induction (EMI) formation characterization systems that are known in the art may be utilized based on the principles described herein for purposes of borehole surveys, in which the electromagnetic source is remotely deployed from the borehole. Similarly, survey systems in logging-while-drilling (LWD) environments with, for example, wired drill pipe telemetry, may be utilized based on the principles herein for purposes of LWD offset surveys utilizing a seismic source.

The survey systems herein may comprise one or more of a wireline tool, a LWD tool, tools deployed by tubing such as production tubing and coiled tubing, and sensors such as geophones cemented behind borehole casing.

Moreover, inventive aspects lie in less than all features of a single disclosed embodiment. Thus, the claims following the Detailed Description are hereby expressly incorporated into this Detailed Description, with each claim standing on its own as a separate embodiment. The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

The invention claimed is:

1. A method of generating a three dimensional (3D) vertical seismic profile (VSP) comprising:
    A) designing a 3D-VSP survey plan including planning a plurality of surface source points and at least one subsurface target reflector;
    B) dividing the subsurface target reflector into a plurality of bins, wherein the 3D-VSP survey plan further comprises a fold threshold for each bin, and for each bin,
        1) firing at least one source at a surface source point at a source firing time,
        2) acquiring subsurface data as a result of the source firing,
        3) updating a velocity model in real-time based on the acquired subsurface data,
        4) calculating, in real time prior to a subsequent source firing for the bin, a fold value for the bin based on the updated velocity model,
        5) comparing, in real time prior to a subsequent source firing for the bin, the the fold value for the bin to the fold threshold for the bin and,
            a) if the fold value for the bin is not within the fold threshold for the bin, repeating parts (1) through (5), or
            b) if the fold value for the bin is within the fold threshold for the bin, activating at least one source at a subsequent source point and repeating parts (1) through (5) for a subsequent bin until the calculated fold value for each bin is within the fold threshold for each bin, for all bins.

2. The method of claim 1 wherein the designing of the 3D-VSP survey plan includes integrating
    surface data selected from the group consisting of graphical information system (GIS) data, maps, restriction zones and combinations thereof, with
    subsurface data selected from the group consisting of wellbore geometry, velocity models, known target reflectors and combinations thereof.

3. The method of claim 1 wherein the designing of the 3D-VSP survey plan further comprises planning tolerances for the plurality of surface source points.

4. The method of claim 1 wherein the designing of the 3D-VSP survey plan further comprises planning a number of subsurface receivers, subsurface receiver depths, subsurface receiver orientations and combinations thereof.

5. The method of claim 1 wherein part (2) further comprises acquiring surface data.

6. The method of claim 5 wherein the subsurface data is selected from the group consisting of subsurface receiver depths, subsurface receiver orientations, one-way transit times at the subsurface receivers, and combinations thereof.

7. The method of claim 5 wherein the surface data is selected from the group consisting of source point location, source firing time and combinations thereof.

8. The method of claim 1 wherein part (3) further comprises updating the velocity model based on one-way transit times at the subsurface receivers, orientation of the subsurface receivers and source point location.

9. The method of claim 1 wherein part (3) further comprises generating a ray-trace model from the updated velocity model and wherein part (4) further comprises using the ray-trace model to calculate the fold value for the bin.

10. The method of claim 1 wherein a plurality of surface source points and the plurality of source firings are planned for each bin, and in part (5)(b), further comprising reducing one of the plurality of surface source points, the plurality of source firings, and combinations thereof, when the fold value for the bin is within the fold threshold for the bin.

11. A method of generating a three dimensional (3D) vertical seismic profile (VSP) comprising:
  A) planning a 3D-VSP survey plan around a borehole based at least in part on an existing velocity model, the planning including planning a pattern of surface source points and selecting at least one subsurface target reflector;
  B) dividing the subsurface target reflector into a plurality of bins and assigning at least one surface source point to each bin, wherein the 3D-VSP survey plan further comprises a fold threshold for each bin, and for each bin,
    1) firing at least one source at the surface source point assigned to the bin at a source firing time,
    2) acquiring subsurface data as a result of the source firing,
    3) updating the existing velocity model in real-time based on the acquired subsurface data,
    4) calculating, in real time prior to a subsequent source firing for the bin, a fold value for the bin based on the updated velocity model,
    5) comparing, in real time prior to a subsequent source firing for the bin, the the fold value for the bin to the fold threshold for the bin and,
      a) if the fold value for the bin is not within the fold threshold for the bin, repeating parts (1) through (5) for other source points assigned to the bin, or
      b) if the fold value for the bin is equal to or greater than an upper limit of the fold threshold for the bin, activating at least one source at a subsequent source point assigned to a subsequent bin and repeating parts (1) through (5) for each subsequent bin until the calculated fold value for each subsequent bin is equal to or greater than a lower limit of the fold threshold for the bin, for all bins.

12. The method of claim 11 wherein the planning of the 3D-VSP survey plan includes integrating surface data selected from the group consisting of graphical information system (GIS) data, maps, restriction zones and combinations thereof, with subsurface data selected from the group consisting of wellbore geometry, additional existing velocity models, known target reflectors and combinations thereof.

13. The method of claim 11 wherein the desired reflection point density range is constant for all bins.

14. The method of claim 11 wherein the desired reflection point density range is not constant for all bins.

15. The method of claim 11 wherein the planning of the 3D-VSP survey further comprises planning a number of subsurface receivers, subsurface receiver depths, subsurface receiver orientations and combinations thereof.

16. The method of claim 11 wherein part (2) further comprises acquiring surface data as well as subsurface data.

17. The method of claim 16 wherein the subsurface data is selected from the group consisting of subsurface receiver depths, subsurface receiver orientations, one-way transit times at the subsurface receivers, and combinations thereof.

18. The method of claim 16 wherein the surface data is selected from the group consisting of source point location, source firing time and combinations thereof.

19. The method of claim 11 wherein part (3) further comprises updating the existing velocity model based on one-way transit times at the subsurface receivers, orientation of the subsurface receivers and source point location.

20. The method of claim 11 wherein part (3) further comprises generating a ray-trace model from the updated velocity model and wherein part (4) further comprises using the ray-trace model to generate the reflection point density map.

21. The method of claim 11 wherein a plurality of surface source points and the plurality of source firings are planned for each bin, and in part (5)(b), if the calculated fold value is greater than the fold threshold when compared in real-time, the plurality of surface source points and surface source firings planned for the bin is reduced.

* * * * *